US009928566B2

(12) United States Patent
Radakovitz et al.

(10) Patent No.: US 9,928,566 B2
(45) Date of Patent: Mar. 27, 2018

(54) INPUT MODE RECOGNITION (71) Applicant: MICROSOFT TECHNOLOGY LICENSING, LLC, Redmond, WA (US)

(72) Inventors: Samuel Chow Radakovitz, Puyallup, WA (US); Clinton Dee Covington, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/841,679

(22) Filed: Aug. 31, 2015

(65) Prior Publication Data

US 2015/0371358 A1 Dec. 24, 2015

Related U.S. Application Data (63) Continuation of application No. 13/355,208, filed on Jan. 20, 2012.

(51) Int. Cl.
*G06T 1/20* (2006.01)
*G06F 3/0487* (2013.01)
(Continued)

(52) U.S. Cl.
CPC .............. *G06T 1/20* (2013.01); *G06F 3/0227* (2013.01); *G06F 3/0416* (2013.01); *G06F 3/0487* (2013.01); *G06F 3/0488* (2013.01)

(58) Field of Classification Search
CPC ... G06F 3/0488; G06F 3/04883; G06F 3/0482
See application file for complete search history.

(56) References Cited

U.S. PATENT DOCUMENTS 5,819,055 A * 10/1998 MacLean .............. G06F 3/0481
715/798
6,657,615 B2 12/2003 Harada
(Continued)

FOREIGN PATENT DOCUMENTS

CN 1848081 A 10/2006
CN 101527745 A 9/2009
(Continued)

OTHER PUBLICATIONS

Office Action dated Mar. 6, 2014, in U.S. Appl. No. 13/355,208 46 pgs.
(Continued)

*Primary Examiner* — Nelson Rosario
*Assistant Examiner* — Chun-Nan Lin
(74) *Attorney, Agent, or Firm* — Merchant & Gould P.C.

(57) ABSTRACT

A touch input mode may be entered and exited automatically and/or manually. When the touch input mode is entered, user interface (UI) elements are optimized for touch input. When the touch input mode is exited, the user interface (UI) elements are optimized for hardware based input. A user may enter the touch input mode by manually selecting a user interface element and/or by entering touch input. Settings may be configured that specify conditions upon which the touch input mode is entered/exited. For example, the touch input mode may be configured to be automatically entered upon undocking a computing device, receiving touch input when in the hardware based input mode, and the like. Similarly, the touch input mode may be configured to be automatically exited upon docking a computing device, receiving hardware based input when in the touch input mode, and the like.

19 Claims, 8 Drawing Sheets (51) Int. Cl.
  *G06F 3/0488* (2013.01)
  *G06F 3/02* (2006.01)
  *G06F 3/041* (2006.01)

(56) References Cited

U.S. PATENT DOCUMENTS

| | | |
|---|---|---|
| 6,938,216 B1 | 8/2005 | Ishisaki |
| 7,158,123 B2 | 1/2007 | Myers et al. |
| 7,533,352 B2 | 5/2009 | Chew |
| 7,581,194 B2 | 8/2009 | Iwema |
| 7,698,654 B2 | 4/2010 | Fong |
| 7,770,126 B2 | 8/2010 | Townsend |
| 7,802,202 B2 | 9/2010 | Fox et al. |
| 7,812,824 B2 | 10/2010 | Im |
| 8,381,133 B2 | 2/2013 | Iwema et al. |
| 8,402,372 B2 | 3/2013 | Gillespie et al. |
| 8,577,957 B2 | 11/2013 | Behar et al. |
| 2002/0175955 A1 | 11/2002 | Gourdol et al. |
| 2003/0046401 A1 | 3/2003 | Abbott |
| 2003/0112585 A1* | 6/2003 | Silvester ............... G06F 1/1616 361/679.41 |
| 2004/0021647 A1 | 2/2004 | Iwema et al. |
| 2004/0039862 A1* | 2/2004 | Hunt ...................... G06F 1/1626 710/304 |
| 2004/0150668 A1 | 8/2004 | Myers |
| 2004/0263475 A1 | 12/2004 | Wecker et al. |
| 2005/0076309 A1 | 4/2005 | Goldsmith |
| 2005/0179647 A1 | 8/2005 | Simmons et al. |
| 2006/0036946 A1 | 2/2006 | Radtke et al. |
| 2006/0200780 A1* | 9/2006 | Iwema .................. G06F 3/0488 715/810 |
| 2006/0242596 A1 | 10/2006 | Armstrong |
| 2006/0248475 A1 | 11/2006 | Abrahamsson |
| 2007/0139386 A1 | 6/2007 | Martin |
| 2007/0162864 A1 | 7/2007 | Masselle et al. |
| 2007/0192714 A1 | 8/2007 | Lee et al. |
| 2007/0238489 A1 | 10/2007 | Scott |
| 2007/0294630 A1 | 12/2007 | Duncan et al. |
| 2008/0163121 A1 | 7/2008 | Lee et al. |
| 2008/0266255 A1 | 10/2008 | Lawson et al. |
| 2008/0307335 A1 | 12/2008 | Chaudhri et al. |
| 2008/0307343 A1 | 12/2008 | Robert et al. |
| 2008/0307364 A1 | 12/2008 | Chaudhri et al. |
| 2009/0007012 A1 | 1/2009 | Mandic et al. |
| 2009/0121903 A1 | 5/2009 | Misage |
| 2009/0199128 A1* | 8/2009 | Matthews ............. G06F 3/0481 715/799 |
| 2009/0228820 A1* | 9/2009 | Kim .................... G06F 3/04817 715/769 |
| 2009/0309849 A1 | 12/2009 | Iwema |
| 2010/0007613 A1 | 1/2010 | Costa |
| 2010/0105443 A1 | 4/2010 | Vaisanen |
| 2010/0107067 A1 | 4/2010 | Vaisanen |
| 2010/0122194 A1 | 5/2010 | Rogers |
| 2010/0162109 A1 | 6/2010 | Chatterjee |
| 2010/0162165 A1 | 6/2010 | Addala |
| 2010/0207888 A1* | 8/2010 | Camiel ................. G06F 1/1616 345/168 |
| 2010/0238126 A1 | 9/2010 | Chen |
| 2010/0241985 A1 | 9/2010 | Kim et al. |
| 2010/0246119 A1* | 9/2010 | Collopy ............... G06F 1/1616 361/679.55 |
| 2010/0251112 A1 | 9/2010 | Hinckley |
| 2010/0265194 A1 | 10/2010 | Liu |
| 2010/0283747 A1 | 11/2010 | Kukulski |
| 2010/0299592 A1 | 11/2010 | Zalewski |
| 2010/0306501 A1* | 12/2010 | Chang .................. G06F 1/1654 712/31 |
| 2010/0318905 A1 | 12/2010 | Rakesh |
| 2011/0050594 A1 | 3/2011 | Kim |
| 2011/0050610 A1 | 3/2011 | Pearce |
| 2011/0055754 A1 | 3/2011 | Nicholas, III et al. |
| 2011/0173533 A1 | 7/2011 | Liu et al. |
| 2011/0202879 A1 | 8/2011 | Stovicek et al. |
| 2011/0241997 A1 | 10/2011 | Yang |
| 2011/0265035 A1 | 10/2011 | Lepage et al. |
| 2012/0050183 A1 | 3/2012 | Lee |
| 2012/0075212 A1* | 3/2012 | Park ..................... G06F 3/04886 345/173 |
| 2012/0137253 A1 | 5/2012 | Eom et al. |
| 2012/0176308 A1 | 7/2012 | Westermann et al. |
| 2012/0254808 A1 | 10/2012 | Gildfind |
| 2013/0019175 A1 | 1/2013 | Kotler et al. |
| 2013/0019182 A1 | 1/2013 | Gil et al. |
| 2013/0050094 A1 | 2/2013 | Rhee et al. |
| 2013/0063455 A1 | 3/2013 | Bayer et al. |
| 2013/0097550 A1 | 4/2013 | Grossman |
| 2013/0104079 A1 | 4/2013 | Yasui et al. |
| 2013/0187855 A1 | 7/2013 | Radakovitz |
| 2013/0191779 A1 | 7/2013 | Radakovitz |
| 2013/0191781 A1 | 7/2013 | Radakovitz |
| 2013/0215048 A1 | 8/2013 | Jang |
| 2014/0033128 A1 | 1/2014 | Patterson et al. |
| 2014/0304648 A1 | 10/2014 | Radakovitz et al. |
| 2014/0354554 A1 | 12/2014 | Devi et al. |
| 2016/0189328 A1 | 6/2016 | Vranjes et al. |
| 2016/0209973 A1 | 7/2016 | Kaufthal et al. |

FOREIGN PATENT DOCUMENTS

| | | |
|---|---|---|
| CN | 101573969 A | 11/2009 |
| KR | 20130023594 A | 3/2013 |

OTHER PUBLICATIONS

Office Action dated Dec. 4, 2014, in U.S. Appl. No. 13/355,208 26 pgs.
Office Action dated Aug. 10, 2015, in U.S. Appl. No. 13/355,208 33 pgs.
Duncan, Tim, "Krita* Gemini*—Twice as Nice on a 2 in 1", Published on: Feb. 3, 2014, Available at: https://software.intel.com/en-us/articles/krita-gemini-twice-as-nice-on-a-2-in-1.
European Supplementary Search Report Received in Patent Application No. 137382481, dated Aug. 6, 2015, 6 pages.
Exploring the Juicebox User Interface, Published on: May 19, 2012, Available at: http://juicebox.net/tour/gallery.
Howse, Brett, "Windows 10 Technical Preview First Impressions: The Return of the Desktop", Retrieved from <<http://www.anandtech.com/show/8705/windows-10-technical-preview-first-impressions-the-return-of-the-desktop, Nov. 13, 2014, 4 Pages.
PCT International Preliminary Report on Patentability Issued in Patent Application No. PCT/US2013/021793, dated Jul. 31, 2014, 6 Pages.
PCT International Search Report and Written Opinion Issued in Application No. PCT/US2016/014200, dated Apr. 26, 2016, 10 Pages.
Rogers, et al., "How to Write a 2 in 1aware Application—Dynamically Adapting your UI to 2 in 1 Configuration changes", Published on: Oct. 31, 2013, Available at: https://software.intel.com/en-us/articles/how-to-write-a-2-n-1aware-application.
U.S. Appl. No. 13/355,208 Office Action dated May 10, 2016, 26 pgs.
U.S. Appl. No. 14/247,831 Office Action dated Feb. 26, 2016, 27 pgs.
Wilson. et al., "Touch and Mouse", Published on: Mar. 13, 2013, Available at: http://www.html5rocks.com/en/mobile/touchandmouse/.
Windows 10 continuum"Design Exploration (No Sound)", Retrieved from <<https://www.youtube.com/watch?v=F_O-LrGL-YQ>>, Sep. 30, 2014, 2 Pages.
First Office Action and Search Report Issued in Chinese Patent Application No. 201380006056.1, dated Sep. 2, 2016, 10 Pages.
U.S. Appl. No. 14/247,831 Final Office Action dated Nov. 18, 2016, 14 pages.
U.S. Appl. No. 13/355,208 Final Office Action dated Nov. 10, 2016, 33 pages.
Second Written Opinion Issued in PCT Application No. PCT/US2016/014200, dated Dec. 14, 2016, 6 Pages.

(56) References Cited

OTHER PUBLICATIONS

U.S. Appl. No. 14/247,831 Office Action dated Apr. 7, 2017, 10 pages.
U.S. Appl. No. 13/355,208, Office Action dated May 17, 2017 , 20 pages.
U.S. Appl. No. 14/755,438, Office Action dated Jun. 15, 2017, 38 pages.
PCT Written Opinion dated Mar. 14, 2017 cited in Application No. PCT/US2016/014200, 16 pages.
Howse, Brett, "Windows 10 Technical Preview First Impressions: The Return of the Desktop", Retrieved from <<http://www.anandtech.com/show/8705/windows-10-technical-preview-first-impressions-the-return-of-the-desktop>>, Nov. 13, 2014, 6 Pages. (Full Version).
U.S. Appl. No. 14/755,438, Office Action dated Nov. 8, 2017, 20 pages.
U.S. Appl. No. 13/355,208, Notice of Allowance dated Dec. 1, 2017, 10 pages.
Connell, A.; "Customizing and Extending the SharePoint 2010 Server Ribbon", Published on: Jan. 2011, Available at: http://msdn.microsoft.com/en-us/library/gg552606.aspx.
Developer.Android.com; Menu Design Guidelines, Retrieved on: Nov. 9, 2011, Available at: http://developer.android.com/guide/practices/ui_guidelines/menu_design.html.
Hardy, et al., "Touch & Interact: Touch-based Interaction of Mobile Phones with Displays", In Proceedings of 10th International Conference on Human Computer Interaction with Mobile Devices and Services, Sep. 2-5, 2008, pp. 245-254.
International Search Report dated Apr. 29, 2013, in PCT/US2013/021791.
International Search Report dated Apr. 30, 2013, in PCT/US2013/021793.
Jetter, et al., "Model-based Design and Implementation of Interactive Spaces for Information Interaction", In Proceedings of Third international conference on Human-centred Software Engineering, 2010, pp. 22-37.
MSDN; "Reconfiguring the Ribbon with Application Modes", Retrieved on: Nov. 9, 2011, Available at: http://msdn.microsoft.com/en-us/library/dd940486(VS.85).Aspx.
MSDN; "Touch", Retrieved on: Nov. 11, 2011, Available at: http://msdn.microsoft.com/en-us/library/windows/desktop/cc872774.aspx.
Office Action dated Feb. 19, 2013, in U.S. Appl. No. 13/355,193 26 pgs.
Office Action dated Apr. 22, 2013, in U.S. Appl. No. 13/355,227 16 pgs.
Office Action dated Aug. 19, 2013, in U.S. Appl. No. 13/355,227.
Office Action dated Oct. 9, 2013, in U.S. Appl. No. 13/355,193 25 pgs.
Office Action dated Mar. 28, 2014, in U.S. Appl. No. 13/355,227 31 pgs.
Office Action dated Dec. 4, 2014, in U.S. Appl. No. 13/355,227 26 pgs.

\* cited by examiner

INPUT MODE RECOGNITION

CROSS-REFERENCE TO RELATED APPLICATION

This application is a continuation of Ser. No. 13/355,208, filed Jan. 20, 2012 entitled TOUCH MODE AND INPUT TYPE RECOGNITION, which is hereby incorporated by reference in its entirety.

BACKGROUND

Many computing devices (e.g. smart phones, tablets, laptops, desktops) allow the use touch input and hardware based input (e.g. mouse, pen, trackball). Using touch input with applications that are designed for hardware based input can be challenging. For example, some interactions associated with hardware based input may not function properly with touch input.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A touch input mode may be entered and exited automatically and/or manually. When the touch input mode is entered, user interface (UI) elements are optimized for touch input. When the touch input mode is exited, the user interface (UI) elements are optimized for hardware based input. A user may enter the touch input mode by manually selecting a user interface element and/or by entering touch input. Settings may be configured that specify conditions upon which the touch input mode is entered/exited. For example, the touch input mode may be configured to be automatically entered upon undocking a computing device, receiving touch input when in the hardware based input mode, and the like. Similarly, the touch input mode may be configured to be automatically exited upon docking a computing device, receiving hardware based input when in the touch input mode, and the like.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
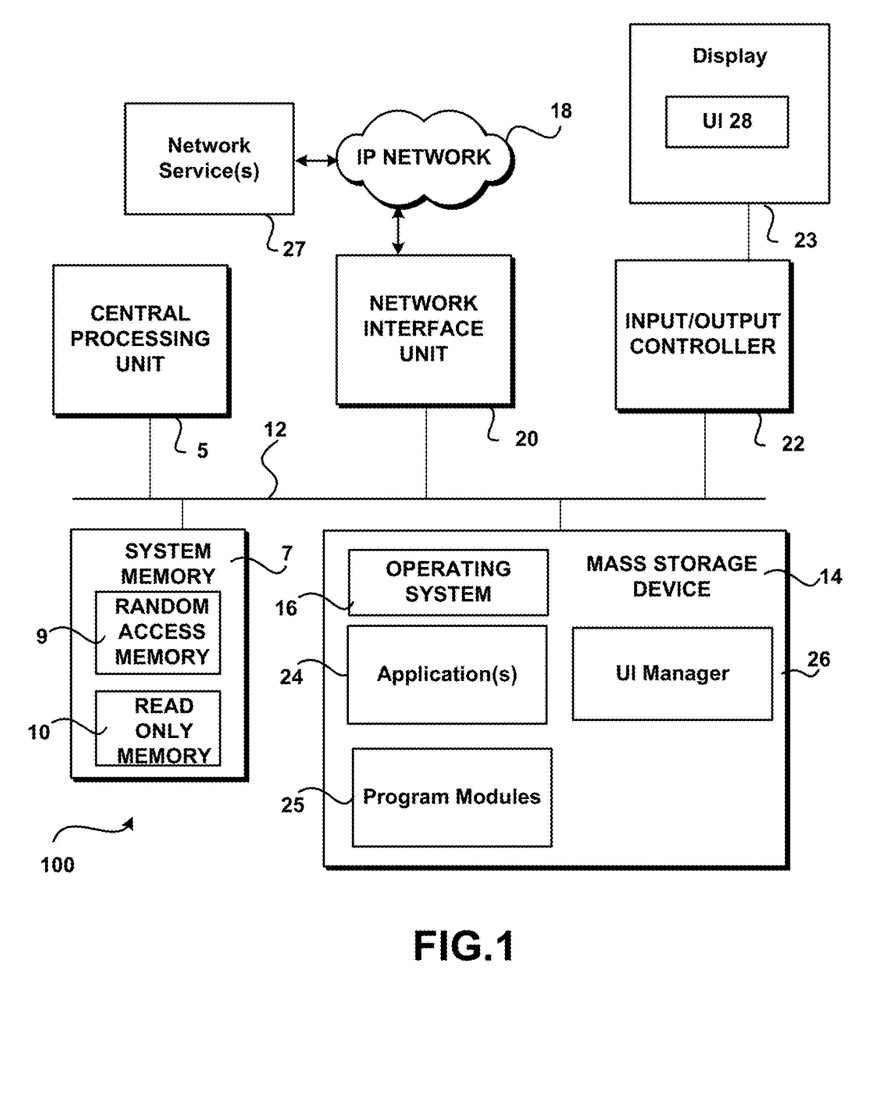
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, netbook, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24 (e.g. productivity application, Web Browser, and the like), program modules 25 and UI manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, a touch input device, or electronic stylus (not shown in FIG. 1). Similarly, an input/output controller 22 may provide input/output to a display screen 23, a printer, or other type of output device.

A touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display. The input/output controller 22 may also provide output to one or more display screens 23, a printer, or other type of input/output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a computer, such as the WINDOWS 8®, WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, such as a spreadsheet application, word processing application and/or other applications. According to an embodiment, the MICROSOFT OFFICE suite of applications is included. The application(s) may be client based and/or web based. For example, a network service 27 may be used, such as: MICROSOFT WINDOWS LIVE, MICROSOFT OFFICE 365 or some other network based service.

UI manager 26 is configured to change between an input mode that includes a touch input mode and a hardware based input mode. The input mode may be entered and exited automatically and/or manually. When the touch input mode is entered, user interface (UI) elements are optimized for touch input. When the touch input mode is exited, the user interface (UI) elements are optimized for hardware based input. A user may enter the touch input mode by manually selecting a user interface element and/or by entering touch input. Settings may be configured that specify conditions upon which the touch input mode is entered/exited. For example, the touch input mode may be configured to be automatically entered upon undocking a computing device, receiving touch input when in the hardware based input mode, and the like. Similarly, the touch input mode may be configured to be automatically exited upon docking a computing device, receiving hardware based input when in the touch input mode, and the like.

The user interface elements (e.g. UI 28) that are displayed are based on the input mode. For example, a user may sometimes interact with application 24 using touch input and in other situations use hardware based input to interact with the application. In response to changing the input mode to a touch input mode, UI manager 26 displays a user interface element optimized for touch input. For example, touch UI elements may be displayed: using formatting configured for touch input (e.g. changing a size, spacing); using a layout configured for touch input; displaying more/fewer options; changing/removing hover actions, and the like. When the input mode is changed to the hardware based input mode, the UI manager 26 displays UI elements for the application that are optimized for the hardware based input. For example, formatting configured for hardware based input may be used (e.g. hover based input may be used, text may be displayed smaller), more/fewer options displayed, and the like.

UI manager 26 may be located externally from an application, e.g. a productivity application or some other application, as shown or may be a part of an application. Further, all/some of the functionality provided by UI manager 26 may be located internally/externally from an application. More details regarding the UI manager are disclosed below.

Figure 2:
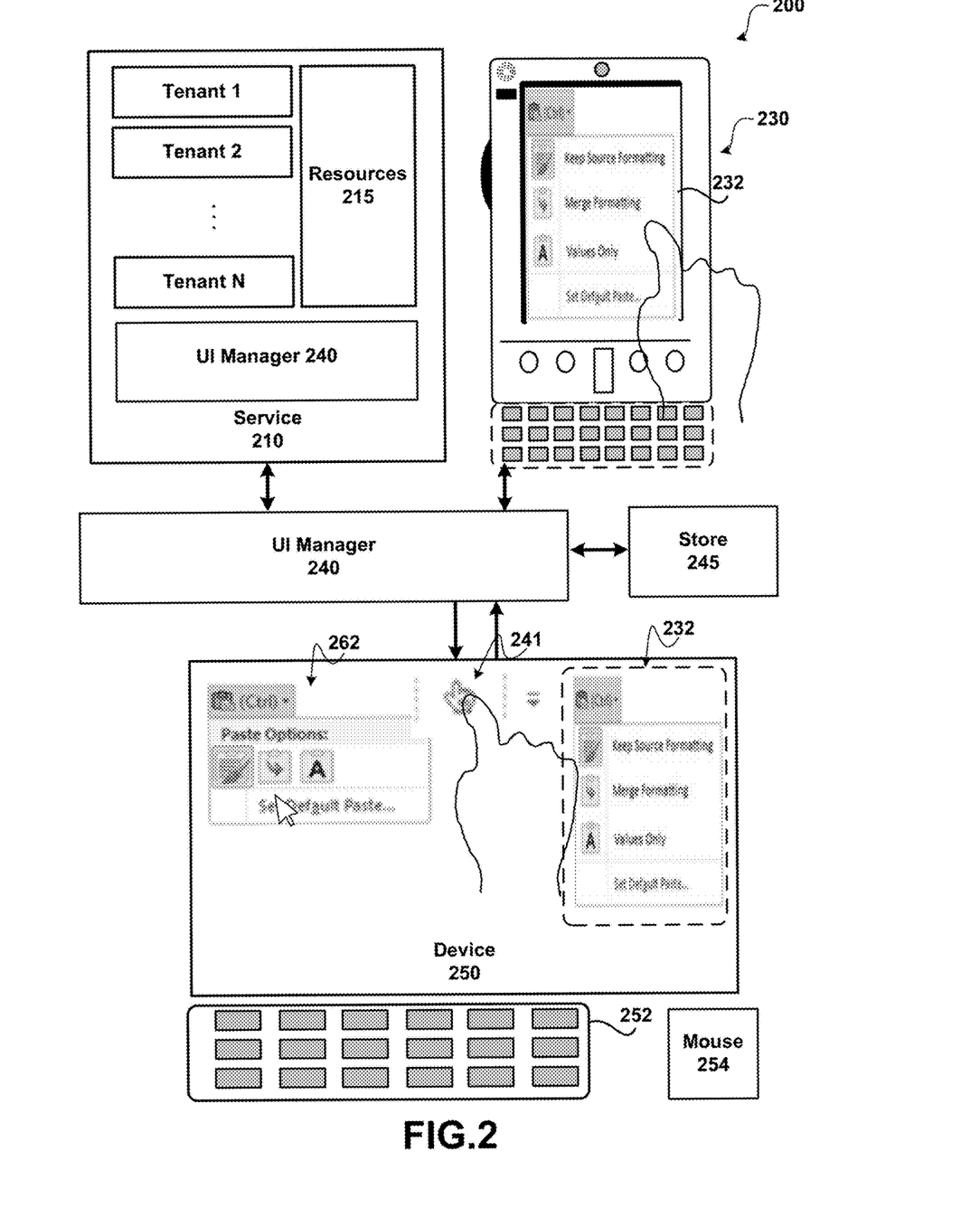
FIG. 2 illustrates an exemplary system for changing an input mode.

FIG. 2 illustrates an exemplary system for changing an input mode. As illustrated, system 200 includes service 210, UI manager 240, store 245, device 250 (e.g. desktop computer, tablet) and smart phone 230.

As illustrated, service 210 is a cloud based and/or enterprise based service that may be configured to provide productivity services (e.g. MICROSOFT OFFICE 365 or some other cloud based/online service that is used to interact with items (e.g. spreadsheets, documents, charts, and the like). Functionality of one or more of the services/applications provided by service 210 may also be configured as a client based application. For example, a client device may include an application that performs operations in response to receiving touch input and/or hardware based input. Although system 200 shows a productivity service, other services/applications may be configured to select items. As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data.

System 200 as illustrated comprises a touch screen input device/smart phone 230 that detects when a touch input has been received (e.g. a finger touching or nearly touching the touch screen) and device 250 that may support touch input and/or hardware based input such as a mouse, keyboard, and the like. As illustrated, device 250 is a computing device that includes a touch screen that may be attached/detached to keyboard 252, mouse 254 and/or other hardware based input devices.

Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Content (e.g. documents, files, UI definitions . . . ) may be stored on a device (e.g. smart phone 230, device 250 and/or at some other location (e.g. network store 245).

As illustrated, touch screen input device/smart phone 230 shows an exemplary display 232 of a menu including UI elements configured for touch input. Device 250 shows a display 262 of a menu including UI elements configured for hardware based input and display 232 of a menu including UI elements configured for touch input when a user is using touch input to interact with device 250. For purposes of illustration both display 232 and display 262 are shown at the same time. In operation, one of the menus is displayed based on the input being received.

UI manager 240 is configured to display differently configured user interface elements for an application based on whether an input mode is set to touch input or the input mode is set to a hardware based input mode.

As illustrated on device 250, a user may switch between a docking mode and an undocked mode. For example, when in the docked mode, hardware based input may be used to interact with device 250 since keyboard 252 and mouse 254 are coupled to computing device 250. When in the undocked mode, touch input may be used to interact with device 250. A user may also switch between the touch input mode and the hardware based input mode when device 250 is in the docked mode.

The following is an example for illustrative purposes that is not intended to be limiting. Suppose that a user has a tablet computing device (e.g. device 250). While working from their desk, the user generally uses mouse 254 and keyboard 252 and leaves computing device 250 docked. The user may occasionally reach out to touch the monitor to scroll or adjust a displayed item, but the majority of the input while device 250 is docked is hardware based input using the mouse and keyboard. UI manager 240 is configured to determine the input mode (touch/hardware) and to display the UI elements for touch when the user is interacting in the touch mode and to display the UI elements for hardware based input when the user is interacting using the hardware based input mode. The UI manager 240 may be part of the application the user is interacting with and/or separate from the application.

The input mode may be switched automatically/manually. For example, a user may select a UI element (e.g. UI 241) to enter/exit touch mode. According to an embodiment, when a device does not support touch input, the UI element 241 is not displayed. For example, a setting on the device (e.g. a flag, property, . . . ) may be set to indicate a type of the device that may be used to determine when the device supports touch input. This setting may also be used to determine a default mode for the device (e.g. when the device is a tablet/slate device then the default mode may be set to the touch input mode). When the user enters the touch mode, UI manager 240 displays the UI elements that are optimized for touch input. The input mode may be switched automatically in response to a type of detected input. For example, UI manager 240 may switch from the hardware based input mode to touch input mode when touch input is received (e.g. a user's finger, hand) and may switch from the touch input mode to the hardware based input mode when a hardware based input, such as mouse input, docking event, is received. According to an embodiment, UI manager 240 disregards keyboard input and does not change the input mode from the touch input mode to a hardware based input mode in response to receiving keyboard input. According to another embodiment, UI manager 240 changes the input mode from the touch input mode to a hardware based input mode in response to receiving keyboard input. A user may disable the automatic switching of the modes. For example, a user may select a UI element to enable/disable the automatic switching of the input mode.

When the user undocks the computing device, UI manager may automatically switch the computing device to touch input mode since device 250 is no longer docked to the keyboard and mouse. In response to switching the input mode to touch, UI manager 240 displays UI elements for the application that are adjusted for receiving the touch input. For example, menus (e.g. a ribbon), icons, and the like are sized larger as compared to when using hardware based input such that the UI elements are more touchable (e.g. can be selected more easily). UI elements may be displayed with more spacing, options in the menu may have their style changed, and some applications may adjust the layout of touch UI elements. In the current example, it can be seen that the menu items displayed when using hardware based input (display 262) are sized smaller and arranged horizontally as compared to touch based UI elements 232 that are sized larger and are spaced farther apart. Additional information may also be displayed next to the icon when in touch mode (e.g. 232) as compared to when receiving input using hardware based input. For example, when in hardware based input mode, hovering over an icon may display a "tooltip" that provides additional information about the UI element that is currently being hovered over. When in touch mode, the "tooltips" (e.g. "Keep Source Formatting", "Merge Formatting", and "Values Only") are displayed along with the display of the icon.

After re-docking device 250, the user may manually turn off the touch input mode and/or touch input mode may be automatically switched to the hardware based input mode.

According to an embodiment, the UI elements change in response to a last input method by a user. A last input type flag may be used to store the last input received. The input may be touch input or hardware based input. For example, the touch input may be a user's finger(s) or hand(s) and the hardware based input is a hardware device used for input such a mouse, trackball, pen, and the like. According to an embodiment, a pen is considered a touch input instead of a hardware based input (as configured by default). When a user clicks with a mouse, the last input type flag is set to "hardware" and when the user taps with a finger, the last input type flag is set to "touch." While an application is running different pieces of UI adjust as they get triggered in based on the value of the last input type flag. The value of the last input type flag may also be queried by one or more different applications. The application(s) may use this information to determine when to display UI elements configured for touch and when to display UI elements configured for hardware based input.

Figure 3:
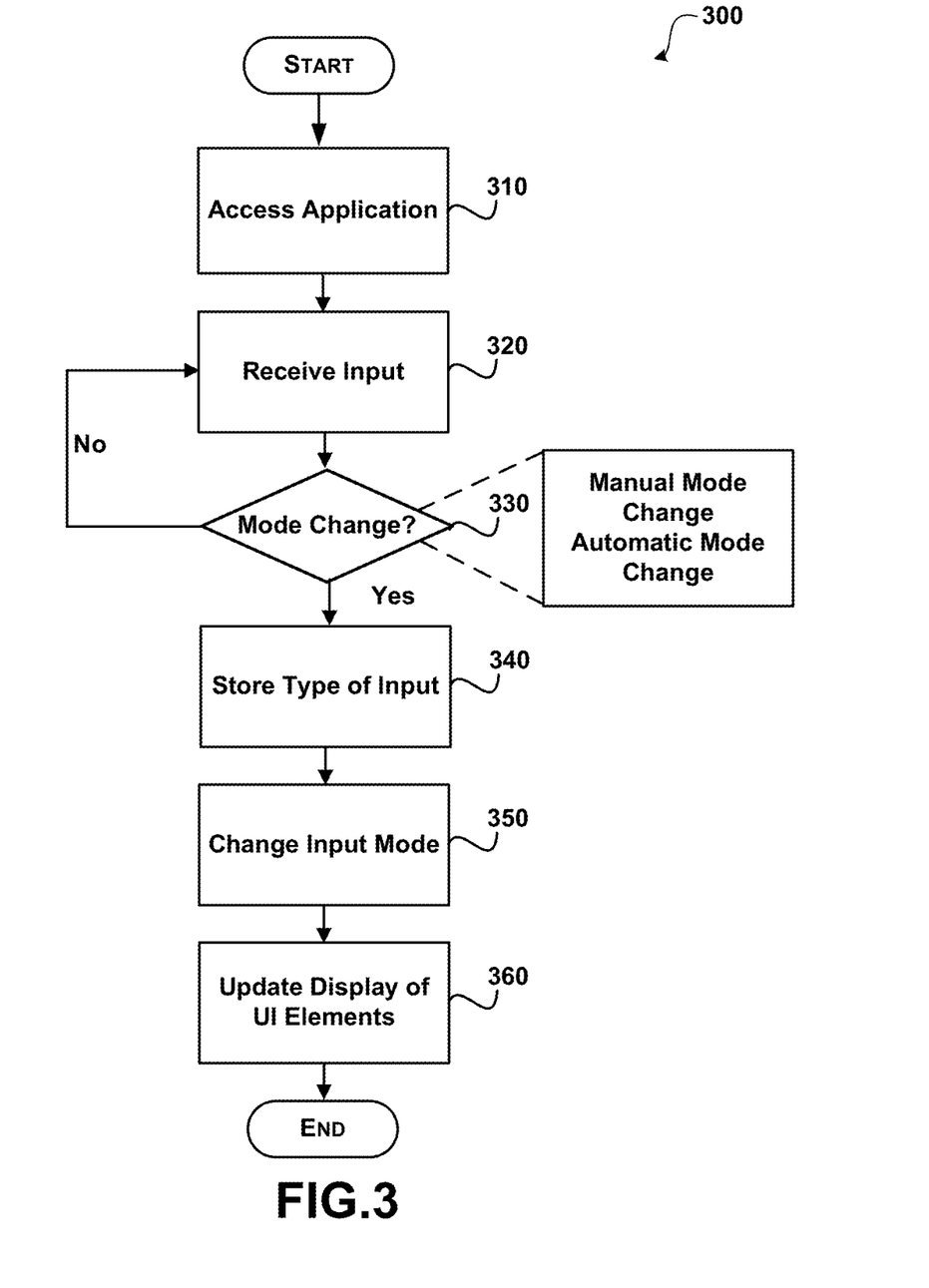
FIG. 3 shows an illustrative processes for switching modes between a touch input mode and a hardware based input mode.

FIG. 3 shows an illustrative processes for switching modes between a touch input mode and a hardware based input mode. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the ordering of the operations may change and be performed in other orderings.

After a start operation, process 300 moves to operation 310, where a user accesses an application. The application may be an operating environment, a client based application, a web based application, a hybrid application that uses both client functionality and/or network based functionality. The application may include any functionality that may be accessed using touch input and hardware based input.

Moving to operation 320, input is received. The input may be touch input or hardware based input. For example, the touch input may be a user's finger(s) or hand(s). According to an embodiment, touch input may be defined to include one or more hardware input devices, such as a pen. The input may also be a selection of a UI element to change the input mode and/or to enable/disable automatic switching of modes.

Transitioning to decision operation 330, a determination is made as to whether to change the input mode. As discussed, the input mode may be selected/toggled between a touch input mode and a hardware based input mode. The determination may be made automatically/manually. For example, when the computing device is initially docked, the determination may be initially set to hardware based input. When a touch device is undocked, the determination may be initially set to touch input. A user may also manually set the mode to touch based and/or hardware based input by selection of one or more UI elements. The input mode may also be set based on a last input method. For example, if a user touches the display, the mode may be touched to touch input until a hardware based input is received.

Flowing to operation 340, the type of input last received is stored. For example, when the last input is hardware based (e.g. mouse, trackball) then the last input received is set to a hardware event and when the last input is a touch input, the last input received is set to a touch event. According to an embodiment, the type of last input disregards keyboard input.

Moving to operation 350, the input mode is changed in response to the determination to change the mode. The input mode may be changed from the touch input mode to the hardware based input mode or from the hardware based input mode to the touch input mode.

Transitioning to operation 360, the UI elements that are configured for the input mode are displayed. The configuration of the UI elements may include adjusting one or more of: a spacing of elements, a size of the elements/text, options displayed, and associating hardware based input methods (e.g. hover) with touch based input displays.

The process then flows to an end block and returns to processing other actions.

Figure 4:
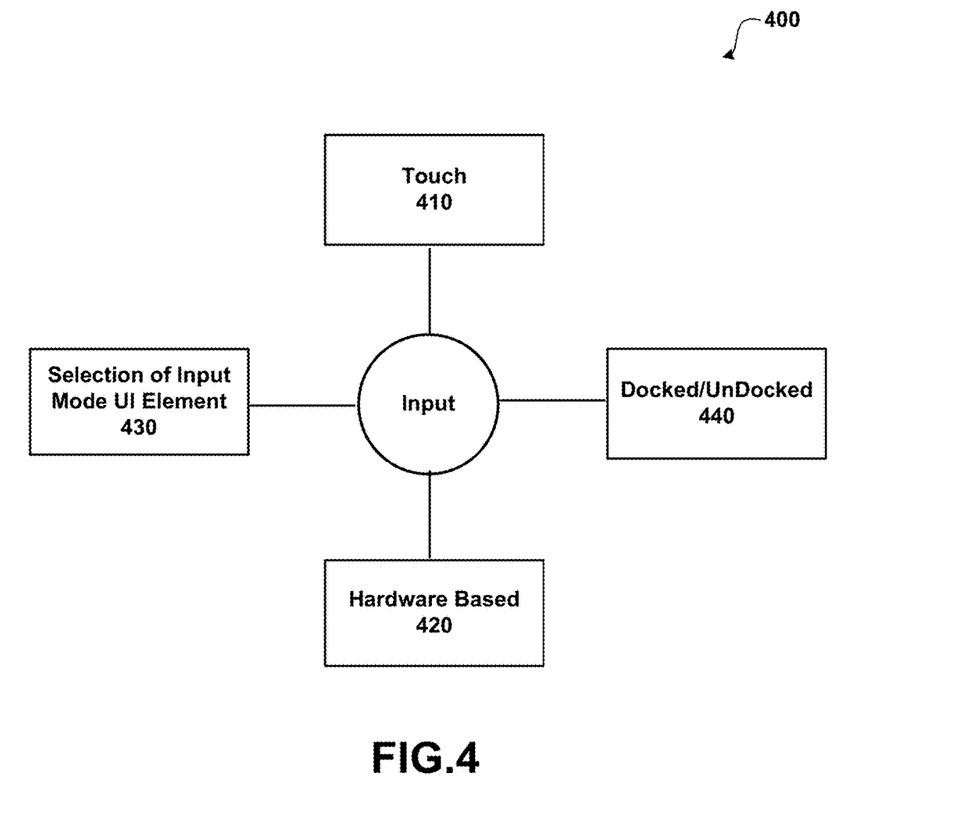
FIG. 4 illustrates a diagram showing different input that may affect a determination of an input mode.

FIG. 4 illustrates a diagram showing different input that may affect a determination of an input mode.

The input mode may be changed in response to detection of touch input (410), hardware based input (420), a docking/undocking (440) of a computing device and/or a selection of a UI element (430).

Figure 5:
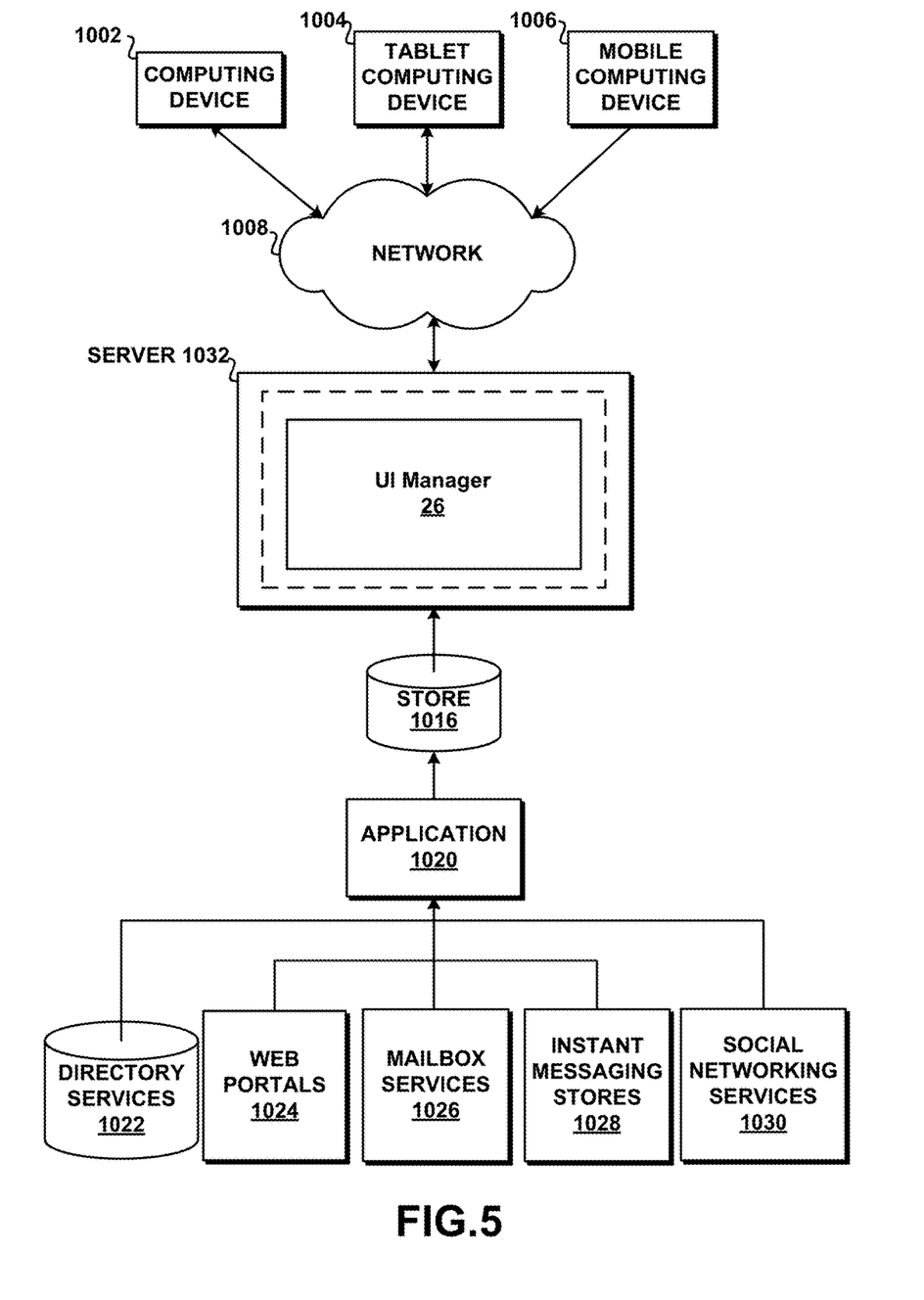
FIG. 5 shows a system architecture used in determining an input mode.

FIG. 5 shows a system architecture used in determining an input mode, as described herein. Content used and displayed by the application (e.g. application 1020) and the UI manager 26 may be stored at different locations. For example, application 1020 may use/store data using directory services 1022, web portals 1024, mailbox services 1026, instant messaging stores 1028 and social networking sites 1030. The application 1020 may use any of these types of systems or the like. A server 1032 may be used to access sources and to prepare and display electronic items. For example, server 1032 may access UI elements for application 1020 to display at a client (e.g. a browser or some other window). As one example, server 1032 may be a web server configured to provide productivity services (e.g. word processing, spreadsheet, presentation . . . ) to one or more users. Server 1032 may use the web to interact with clients through a network 1008. Server 1032 may also comprise an application program. Examples of clients that may interact with server 1032 and a spreadsheet application include computing device 1002, which may include any general purpose personal computer, a tablet computing device 1004 and/or mobile computing device 1006 which may include smart phones. Any of these devices may obtain content from the store 1016.

Figure 6:
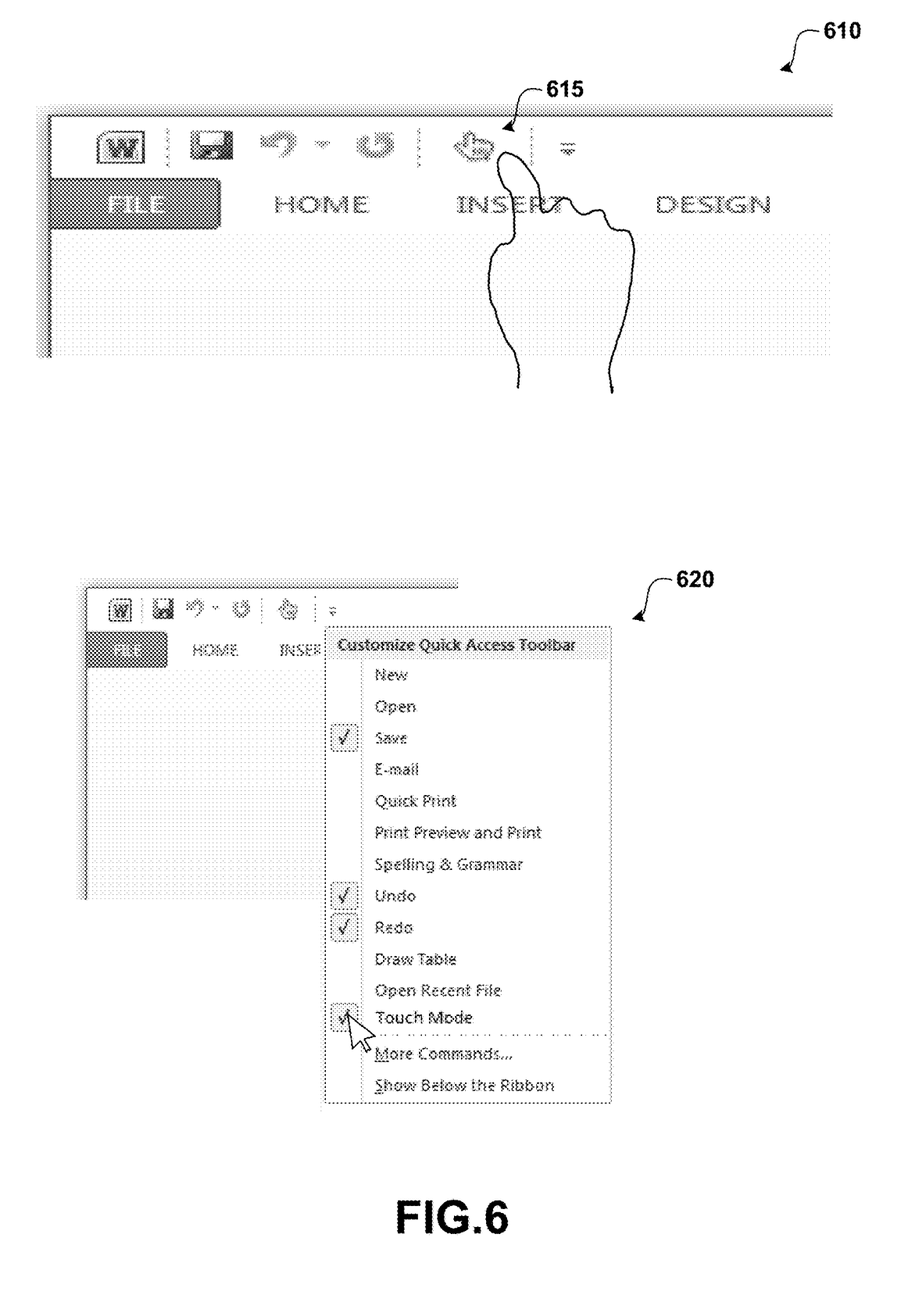
FIG. 6 shows an exemplary UI for selecting an input mode.
Figure 7:
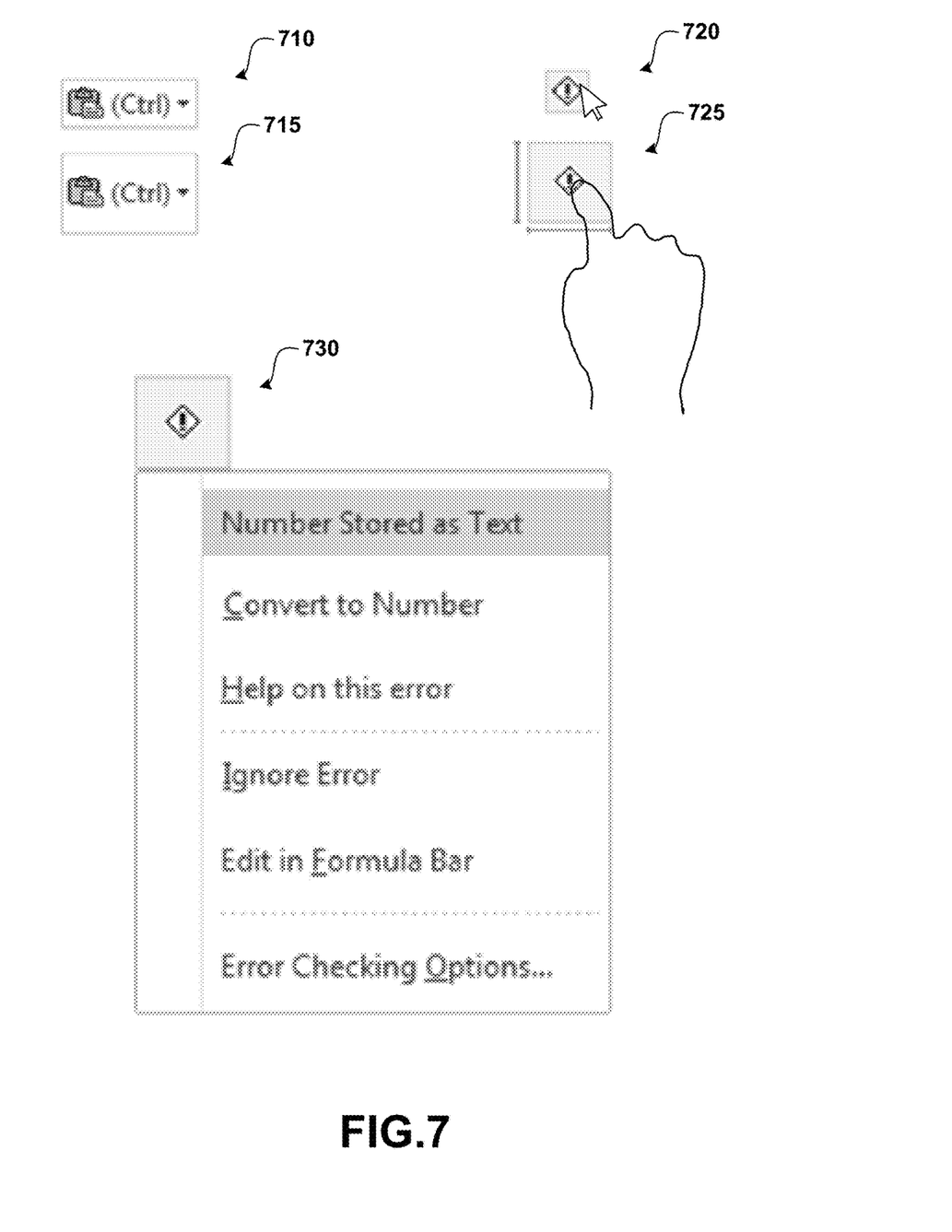
FIG. 7 shows UI elements sized for hardware based input and UI elements sized for touch input.

FIGS. 6-7 illustrate exemplary displays showing user interface elements configured for touch and hardware based input. FIGS. 6-7 are for exemplary purpose and are not intended to be limiting.

FIG. 6 shows an exemplary UI for selecting an input mode.

As illustrated, display 610 shows selection of a UI element to change the input mode. For example, a user may select UI element 615 to toggle between input modes. The displays may be associated with a desktop application, a mobile application and/or a web-based application (e.g. displayed by a browser). The display may be displayed on a limited display device (e.g. smart phone, tablet) or on a larger screen device.

Display 620 shows menu options for configuring whether or not to display UI element 615.

FIG. 7 shows UI elements sized for hardware based input and UI elements sized for touch input.

Hardware based input UI elements (e.g. 710, 720) are displayed smaller than corresponding touch input UI elements (e.g. 715, 725).

Display 730 shows selection of touch based UI element 725. The spacing of the menu option is display 730 are farther apart as compared to a corresponding hardware based input menu.

Figure 8:
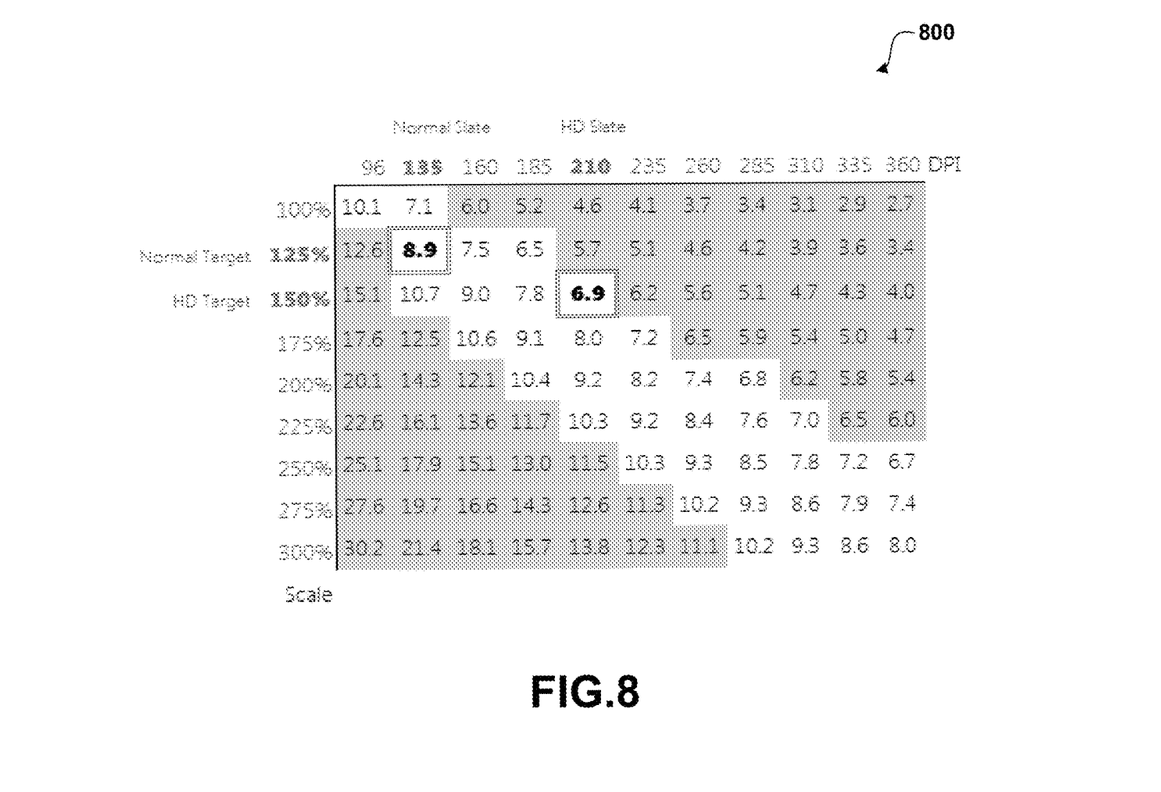
FIG. 8 illustrates an exemplary sizing table that may be used in determining a size of UI elements.

FIG. 8 illustrates an exemplary sizing table that may be used in determining a size of UI elements.

Table 800 shows exemplary selections for setting a size of UI elements that are configured for touch. According to an embodiment, a target size of 9 mm is selected with a minimum size of 6.5 mm. Other target sizes may be selected.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for input type recognition, comprising:
  determining whether a computing device is docked versus undocked;
  in response to determining that the computing device is undocked, establishing an undocked mode, wherein the undocked mode optimizes a display of user interface elements on the computing device for touch based input interactions, and configures the user interface elements for receiving the touch based input interactions;
  in response to determining that the computing device is docked, establishing a docked mode, wherein the docked mode optimizes the display of the user interface elements on the computing device for hardware based input interactions, configures the user interface elements for receiving the hardware based input interactions, and includes a user interface toggle to accept touch based input.

2. The method of claim 1, wherein the docked mode is configured to determine when the computing device receives a touch based input.

3. The method of claim 2, further comprising:
  in response to determining the computing device receives a touch based input, optimizing the display of user interface elements for touch based input interactions.

4. The method of claim 3, wherein the docked mode continues to receive hardware based input.

5. The method of claim 4, wherein the hardware based input includes keyboard input.

6. The method of claim 1, wherein the computing device automatically switches from the undocked mode to the docked mode when the computing device is docked.

7. The method of claim 1, wherein the computing device automatically switches from the docked mode to the undocked mode when the computing device is undocked.

8. A system for input type recognition, comprising:
  a display device that is configured to receive touch based input;
  a processor and memory;
  an operating environment executing using the processor outputting to the display and configured to receive inputs via the display;
  an application that includes a first configuration of user interface elements for use with touch based input and a second configuration of the user interface elements for use with hardware based input; and
  a user interface manager operating in conjunction with the application that is configured to perform actions comprising:
    determining whether a computing device is docked versus undocked;
    in response to determining the computing device is undocked, establishing an undocked mode being configured to accept touch based input, the undocked mode optimizing a display of user interface elements on the display device for touch based input interactions, and configuring the user interface elements for receiving the touch based input interactions;
    in response to determining the computing device is docked, establishing a docked mode being configured to accept hardware based input, the docked mode optimizing the display of user interface elements on the display device for hardware based input interactions, configuring the user interface elements for receiving the hardware based input interactions, and includes a user interface toggle to accept touch based input.

9. The system of claim 8, wherein the docked mode is configured to determine when the computing device receives a touch based input.

10. The system of claim 9, further comprising:
  in response to determining the computing device receives a touch based input, optimizing the display of user interface elements for touch based input interactions.

11. The system of claim 10, wherein the docked mode is continues to receive hardware based input.

12. The system of claim 11, wherein the hardware based input includes keyboard input.

13. The system of claim 8, wherein the display in the docked mode includes a user interface element to manually switch to accept touch based input.

14. The system of claim 8, wherein the computing device automatically switches from the undocked mode to the docked mode when the computing device is docked.

15. The system of claim 8, wherein the computing device automatically switches from the docked mode to the undocked mode when the computing device is undocked.

16. A computer-readable storage device storing computer-executable instructions for input type recognition, comprising:
  determining whether a computing device is docked versus undocked;
  in response to determining the computing device is undocked, establishing an undocked mode being configured to accept touch based input, the undocked mode optimizing a display of user interface elements for touch based input interactions, and configuring the user interface elements for receiving the touch based input interactions;
  in response to determining the computing device is docked, establishing a docked mode being configured to accept hardware based input, the docked mode optimizing the display of the user interface elements for hardware based input interactions and configuring the user interface elements for receiving the hardware based input interactions, and includes a user interface toggle to accept touch based input, the docked mode being further configured to determine when the computing device receives a touch based input, and in response to receiving the touch based input, optimizing the display of the user interface elements for receiving the touch based input interactions and configuring the user interface elements for receiving the touch based input interactions.

17. The computer-readable storage device of claim 16, wherein the docked mode continues to receive hardware based input.

18. The computer-readable storage device of claim 17, wherein the hardware based input includes keyboard input.

19. The computer-readable storage device of claim 16, wherein the hardware based input includes input received from a keyboard, mouse, touch input device, or electronic stylus.

\* \* \* \* \*